Aug. 24, 1954  M. KOFFLER  2,687,085
MACHINE FOR EXTRACTING JUICE FROM CITRUS FRUIT
Filed April 27, 1950  4 Sheets-Sheet 1
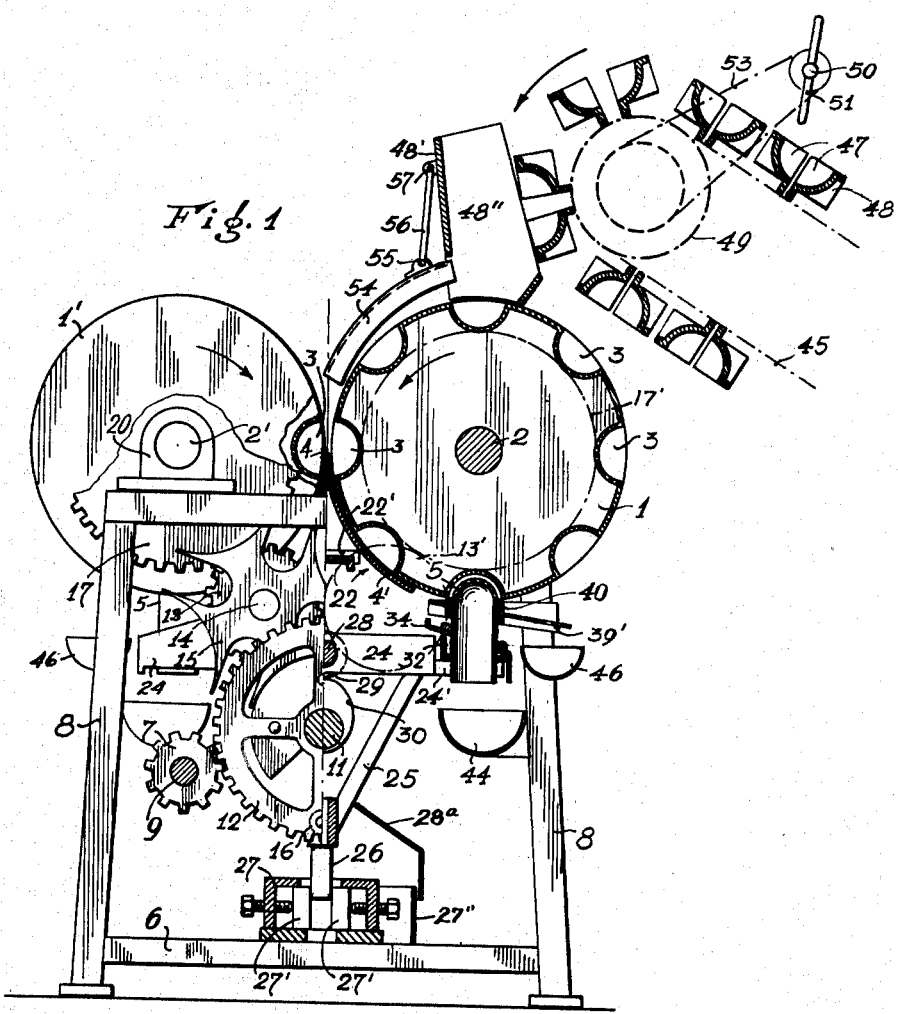
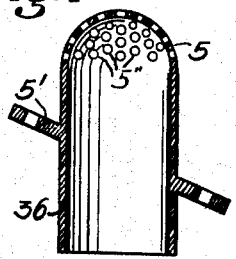
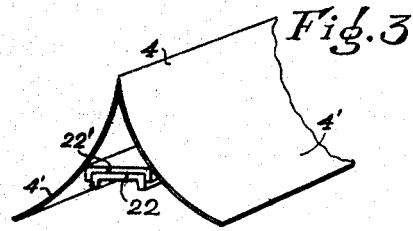
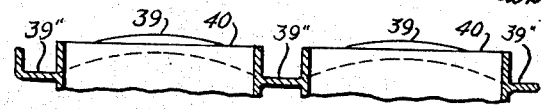
INVENTOR
Maximilian Koffler
BY
J. F. Basseches
his ATTORNEY Aug. 24, 1954  M. KOFFLER  2,687,085
MACHINE FOR EXTRACTING JUICE FROM CITRUS FRUIT
Filed April 27, 1950  4 Sheets-Sheet 2
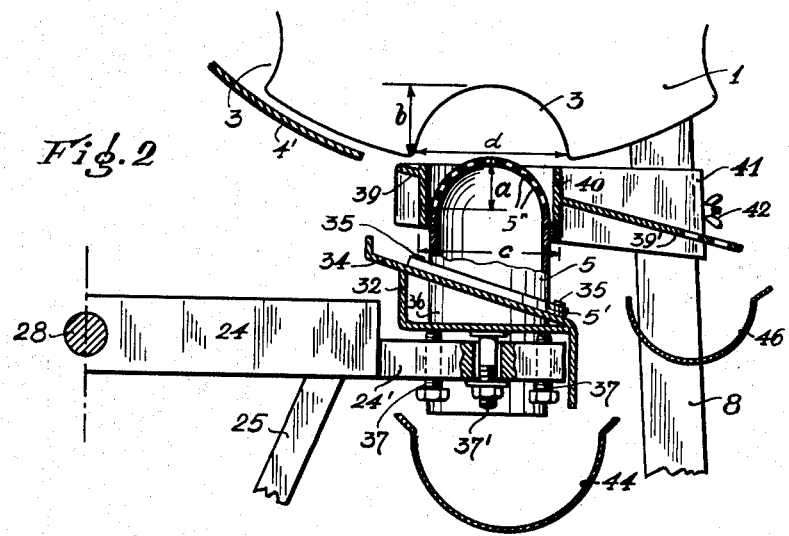
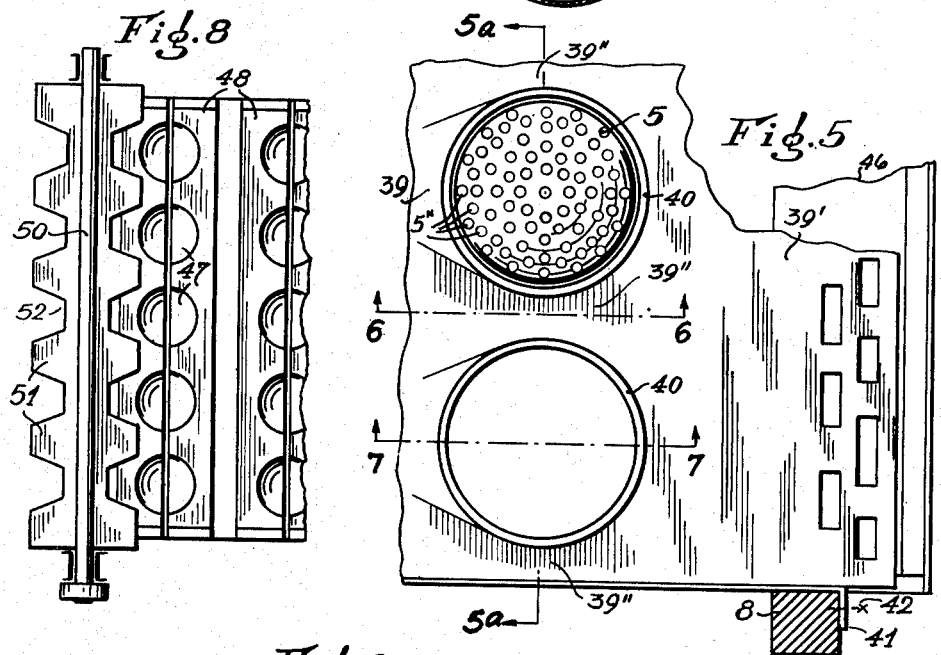
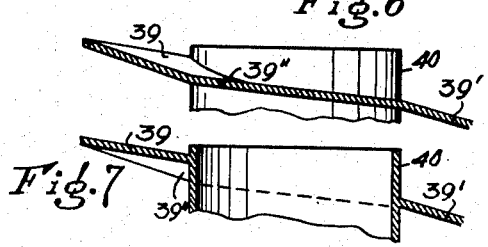
INVENTOR
Maximilian Koffler
BY
his ATTORNEY INVENTOR
Maxmilian Koffler Aug. 24, 1954　　　　　　M. KOFFLER　　　　　2,687,085
MACHINE FOR EXTRACTING JUICE FROM CITRUS FRUIT
Filed April 27, 1950　　　　　　　　　　　　4 Sheets-Sheet 4
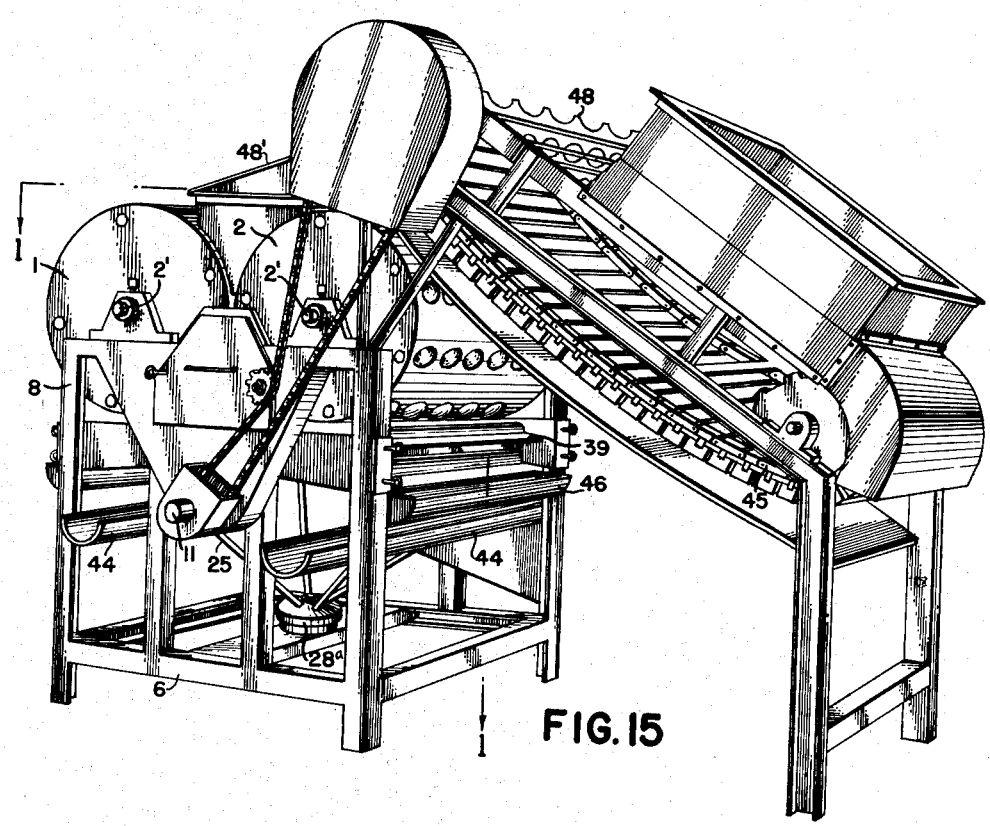
FIG. 15
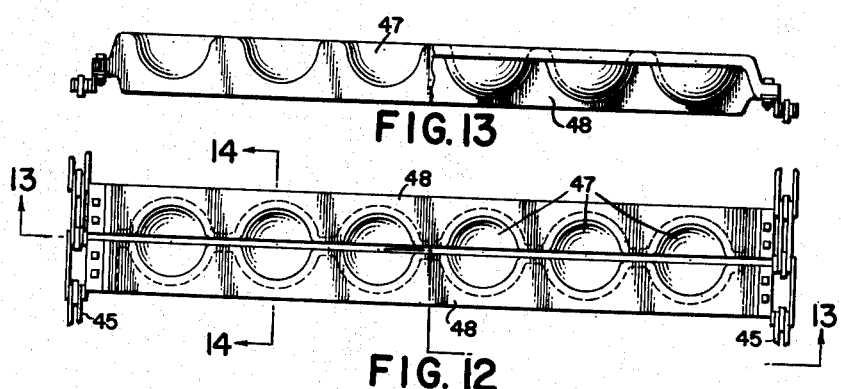
FIG. 13
FIG. 12
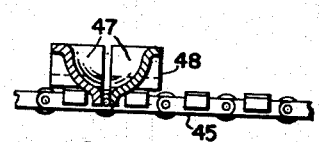
FIG. 14
INVENTOR
Maximilian Koffler
BY *J. T. Bassches*
*His* ATTORNEY Patented Aug. 24, 1954

2,687,085

UNITED STATES PATENT OFFICE 2,687,085

MACHINE FOR EXTRACTING JUICE FROM CITRUS FRUIT

Maximilian Koffler, Tel Aviv, Israel

Application April 27, 1950, Serial No. 158,400

2 Claims. (Cl. 100—97)

The invention relates to machines for extracting juice from citrus fruit of the type comprising two drums, which are mounted on parallel horizontal axes and are driven to rotate intermittently at equal speed and in opposite directions, the drums being juxtaposed so as to leave a narrow gap between them, their movements within the gap being directly downwardly, circumferential rows of approximately hemispherical depressions being provided on the drums so that the depressions of one drum form each with a corresponding depression of the other drum an approximately spherical hollow space each time they lie opposite each other in said gap; a knife projecting from beneath into said gap and adapted to cut into two parts any fruit placed into the depressions of one of the drums; and pressing or juice squeezing members arranged underneath the drums and caused by suitable driving means to move up and down, so as to act during the periods of rest of the drums on the fruit halves in the depressions which are at that time at their lowermost position.

One object of the invention is to construct a machine of this type which is capable of handling great quantities of fruit and delivering the greatest part of the juice contained in this fruit.

A further object of the invention is to obtain a juice of high purity and to separate and recover the oily contents of the peel of the fruit.

Yet another object of the invention is to make the working parts of the machine easily removable for the sake of cleaning them at short intervals from any adhering fruit and juice residues likely to spoil the fresh juice. Incidentally the removable parts can also be easily replaced or exchanged in case they happen to become damaged by solid objects introduced into the machine with the fruit.

Figure 9:
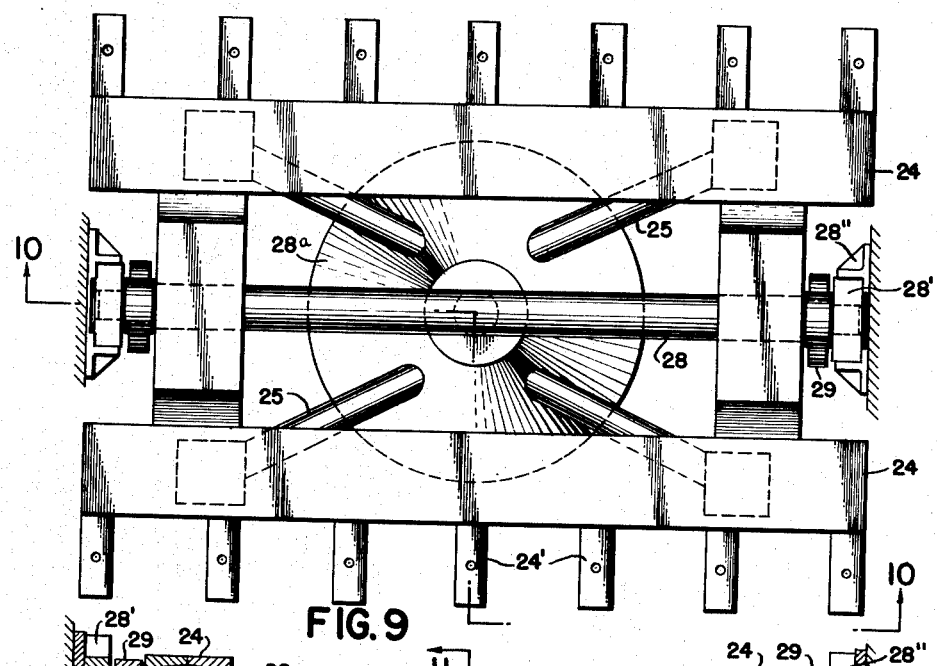
Figure 10:
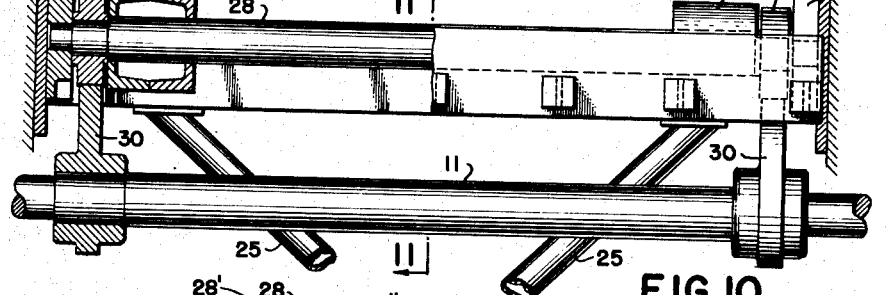
Figure 11:
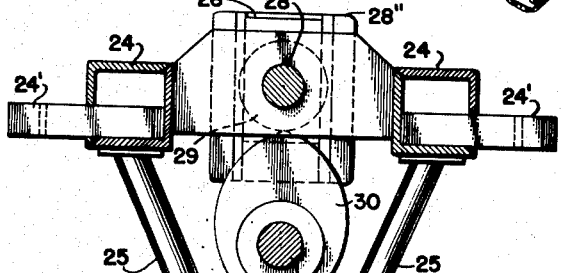

These and other objects of the invention will be explained in detail by the following description, reference being had to the accompanying drawings wherein Fig. 1 shows a vertical partly cross-sectional view of the machine in elevation; Fig. 2 shows a part of Fig. 1 on a larger scale; Fig. 3 shows the knife and its support; Fig. 4 shows a juice squeezing member; Fig. 5 is a plan view of a part of a tray arranged underneath a drum; Fig. 5a is a section taken on the line Va—Va of Fig. 5; and Figs. 6 and 7 show vertical sections on the lines VI—VI, VII—VII of Fig. 5, respectively. Fig. 8 shows a plan view of the wiper and a part of the conveyor. Fig. 9 is a plan view of the table; Fig. 10 is a staggered vertical section on the line 10—10 of Fig. 9; Figure 11 is a section taken on the line 11—11 of Fig. 10; Fig. 12 is a plan view of two adjacent bars 48 attached to conveyor chains; Fig. 13 is a staggered section taken on the line 13—13 of Fig. 12; Fig. 14 is a section taken on the line 14—14 of Fig. 12; Fig. 15 is a perspective view of the assembly, the section lines 1—1 indicating the plane of the cross-section shown in part in Fig. 1.

The machine consists essentially of two cooperating rotary drums 1, 1' fastened on two parallel horizontal shafts 2, 2' journalled in bearings 20 fixed on the machine frame 8. The drums are provided with several circumferential and longitudinal rows of approximately hemispherical depressions 3 and are so juxtaposed and driven that the depressions of one drum, form together with depressions of the second drum, spherical hollow spaces and only a narrow gap between both drums exists. Into this gap projects from below a knife 4. Beneath each drum and in the vertical axial plane thereof there is arranged a row of pressure members 5 adapted to enter into the depressions 3 of the corresponding drum. It is understood that the left side of the machine is symmetrical with the right one and the members 5 on the left side of the device shown in Fig. 1 are analogical.

In the machine frame is also journalled a shaft 9 carrying a pinion 7 meshing with a toothed wheel 12 keyed on a shaft 11 which is journalled between and below the drums and parallel with their axes. On a shaft 14 are journalled a Maltese cross 15 and a cog wheel 13. On the wheel 12 is arranged a roller 16 which engages the Maltese cross 15 and turns the latter and the wheel 13 at each rotation of wheel 12 for a partial turn only. Wheel 13 meshes with wheel 17 fixed on shaft 2' of the left drum, so that this drum is each time rotated for an angle corresponding to the distance between two depressions 3 of the circular rows on the drum. A wheel similar to wheel 17 is keyed on shaft 2 of the right drum and its rotation is effected from the first named wheel 13 through a similar intermediate wheel 17' by a pinion of the size of wheel 13 and engaging into the latter and into the wheel similar to wheel 17, so that both drums rotate synchronously towards each other, approaching the gap between them from above.

Underneath said gap and parallel to the axes of the drums extends a U-shaped fixed beam 22 which carries a knife 4. This knife is of a wedge-like shape and is composed of two plates 4' welded at their upper edges forming a horizontal cutting edge. The plates 4' are bent apart underneath that edge to conform to the curvature of the drums and are connected beneath the knife-edge by a bridge 22' which rests on the beam 22. Bridge 22' with knife 4 can be slid on beam 22 and thus removed from the machine.

Underneath the drums there is arranged a vertically movable table 24 carrying near its two longitudinal edges squeezing members 5 which move together with the table and in their upper position enter the depressions 3 of the drums. Table 24 is fastened on a shaft 28 which by means of rollers 29 provided an its ends rests on cams 30 keyed to shaft 11. The ends of this shaft are journalled in slides 28' vertically movable in guides 28" fixed to the machine frame. Table 24 is connected by inclined struts 25 extending from the four corners thereof with a central vertical quadrangular spigot 26 located in the base plate 6. Spigot 26 is vertically guided between two blocks 27' which are adjustable within the housing 27 in a direction perpendicular to the axis of shaft 28 thus enabling the table 24 to be adjusted into exact horizontal position. Housing 27 is enclosed within the cylindrical shield 27" fixed on the base plate and hood 28a is fixed to the struts 25. The rotating cams 30 on the ends of the shaft 11 cause the shaft 28 and table 24 to be raised and lowered with the squeezing members 5.

Table 24 has on either of its longitudinal edges a series of laterally extending arms 24' on which are located boxes 32 covered by plates 34 inclined to the outside. The squeezing members 5 have inclined flanges 5' by means of which and of screws 35 they are removably fastened to the plates 34. These members have beneath their perforated heads tubular prolongations 36 which project through the boxes 32 and the plates 34 into the spaces between the arms 24' of table 24. The boxes 32 rest on set screws 37 screwed in some of the arms 24' and can by means of these screws be vertically adjusted together with the squeezing members 5. The adjusted boxes 32 together with the squeezing members 5 are fixed in their vertical position by means of clamping screws 37' fixed to the boxes 32 and passing through holes in the arms 24'. After unscrewing the nut from the screws 37' the boxes 32 with plates 34 can be removed from the machine together with all squeezing members for cleaning or repair purposes.

Beneath the rows of the squeezing members 5 and beneath the plates 39' are arranged juice collecting channels 44 and oil collecting channels 46, respectively.

The parts 39" of the trays 39 between the cylinders 40 are a little below the rest of the surface of the trays thus forming shallow depressions. The cylinders 40 may partly project above the trays 39. By these means the liquid flowing down the tray 39 is diverted into the depressed parts 39" of same and prevented from entering into the open ends of the cylinders 40 which may be regarded as being guide openings for the members 5. Furthermore the perforations 5" of the members 5 (see Fig. 4) are confined to the uppermost domed area of the members only up to a height or depth $a$ which is at the most equal to less than the depth $b$ of the hemispherical depressions, as indicated in Fig. 2, and the outer diameter $c$ of the cylinders 40 is shorter than the diameter $d$ of the depressions 3. Thus through the perforations only pure juice is drained off and the impure juice is diverted into the collecting channel 46. Trays 39 extend between two vertical flanges 41 forming walls, the front edges of which are angularly outwardly bent and which are removably fastened at this point by means of screws 42 to the machine frame 8.

The fruit is preferably fed into the machine by means of an elevator. The elevator used consists of endless chains 45 running over and driven by sprocket wheels indicated by the numeral 49. To the chains are fastened plates or bars 48 in parallelism to the axis of the drums. Each bar is provided with or formed to present as many half scoops or buckets 47 as there are depressions 3 in each horizontal row of depressions in the drums. The half-buckets of each two neighboring bars close to form a bucket when they are in the straight part of the chains, but open when they are on the circumference of the sprockets.

The fruit falls from a storage bin (not shown) into the closed scoops of the elevator and is carried upwards and released into a receptacle 48' at the upper end of the elevator where the half-scoops open. Receptacle 48' is divided by parallel vertical walls 48" in as many partitions as there are scoops in each bar of the elevator and depressions 3 in each single horizontal row of the drums, so that each circumferential row of depressions 3 is fed from a separate partition of the receptacle 48'. The corresponding depressions of both drums successively enclose the individual fruits, carry them towards the knife 4 which cuts them into halves, and then towards the squeezing members 5. Each time a longitudinal row of the fruit-halves is above a row of squeezing members 5 the drums stop rotating. On their way from the cutting edge of the knife 4 to the squeezing members 5 the halves of the fruit are held within the depressions 3 of the drums by the plates 4' of the knife. The members 5 pass through the cylinders 40 of the plates 39 into those depressions 3 which happen to be lowermost and squeeze out the juice from the flesh of the halves of the fruit. This juice flows down through the perforations of the members 5 and the prolongations 36 of the latter into the collecting channel 44. The juice in channel 44 is quite pure and free from oil and other ingredients pressed from the peel during the cutting and squeezing operations. The oil and those other ingredients flow down on the tray 39 and through its perforations into the collecting channel 46.

It may happen that the fruit is not properly located, that is, it does not lie within the scoops, but between them, or it may occur that two pieces of the fruit are retained, one above or beside the other, in the same scoop. The fruit is then untimely supplied to the drums and becomes crushed therebetween with the undesirable results indicated above.

Such occurrences are now eliminated by a wiper, which is adapted to throw back the improperly located fruit or to divert the latter into proper position. The wiper is arranged near the upper end of the elevator and consists of an axle 50 with diagonally thereon fixed plates or wings 51. The wings have as many cutouts 52 as there are scoops on the horizontal bars of the elevator so as to afford free passage to the fruit properly located in the scoops. Axle 50 is driven by the mentioned sprockets 49 by means of sprocket chain 53. The rotating wiper removes any superfluous fruit and thus eliminates the likelihood of two fruits being at the same time supplied through said compartments into the depressions of the drum. Once the fruit is in the depressions of the drum it is likely to jump out therefrom at each jerk of the intermittently rotated drum and to clog the machine. This is now prevented by the arrangement of curved shields 54 covering the particular circumferential rows of depressions. These shields are preferably articulated at 55 to links 56 suspended at 57 from the front wall of the housing of the compartments 48'. The shields have advantageously a cross-section of an inverted channel and extend from the point where the fruit enters the depressions up to the point near the edge of the knife 4. Thanks to their yielding suspension, the shields 54 adapt themselves automatically to the varying sizes of the fruit.

The wiper and the shields serve the purpose of a perfect guiding of the fruit up to the halving knife. But the wiper and the shields can advantageously also be used separately from each other. The machine can now work without special supervision on the part of the attendant.

What I claim is:

1. In a machine for extracting juice from citrus fruit comprising two intermittently rotating spaced drums having peripheral circumferential hemispherical depressions in rows parallel to the axes of the drums and having juice squeezing members with means for projecting the same to enter into said depressions, and means for supplying the fruit to the rows of the depressions of one drum, a knife structure comprising a wedge-like knife, composed of two diverging plates, adapted to be disposed in the space between the two drums, said knife including a horizontal bridge underneath the line of meeting of the diverging plates and connected to said two plates, and a fixed horizontal beam beneath the bridge on which said bridge slidingly rests, said bridge being adapted to be secured to a part of the machine.

2. A machine for extracting juice from citrus fruit comprising a pair of spaced intermittently rotating horizontal drums having hemispherical depressions arranged on the circumference of each drum in rows parallel to the axes of the drums, juice squeezing members having means to insert same into said depressions, means for supplying the fruit to said depressions of one drum, a knife disposed in the space between the two drums for cutting the fruit in two parts, each of said squeezing members having at their upper end a perforated dome-shaped closure, the said perforations being distributed on the closure to a height which is no greater than the depth of the hemispherical depressions, a vertically movable table adapted to carry said squeezing members, laterally projecting spaced arms disposed along an edge of the table, said arms having thereon plate members adapted to receive the lower ends of the squeezing members therethrough, a stationary juice collecting trough disposed beneath the table for receiving juice from the fruit in said depressions and guide means comprising hollow cylinders open at both ends adapted to receive and guide into the said depressions the dome-shaped upper end portion of said squeezing members, and said hollow cylinders having an external diameter smaller than the diameter of the mouth of said depression.

References Cited in the file of this patent

UNITED STATES PATENTS

| Number | Name | Date |
|---|---|---|
| 1,107,991 | Park | Aug. 18, 1914 |
| 1,888,528 | Faulds | Nov. 22, 1932 |
| 2,114,218 | Edenfield | Apr. 12, 1938 |
| 2,130,610 | Brown | Sept. 20, 1938 |
| 2,313,318 | Brown | Mar. 9, 1943 |
| 2,332,177 | Smith | Oct. 19, 1943 |
| 2,354,721 | Walker | Aug. 1, 1944 |
| 2,574,922 | Karp | Nov. 13, 1951 |

FOREIGN PATENTS

| Number | Country | Date |
|---|---|---|
| 419,505 | Italy | Mar. 26, 1947 |
| 613,194 | Great Britain | Nov. 23, 1948 |